US010462818B2

(12) United States Patent
Prins et al.

(10) Patent No.: US 10,462,818 B2
(45) Date of Patent: Oct. 29, 2019

(54) METHOD OF TRANSMITTING DATA BETWEEN NETWORK DEVICES OVER A NON-DETERMINISTIC NETWORK

(71) Applicant: Robert Bosch GmbH, Stuttgart (DE)

(72) Inventors: Anton Prins, Son en Breugel (NL); Hans S. P. Van Der Schaar, Breda (NL)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 15/535,481

(22) PCT Filed: Dec. 16, 2014

(86) PCT No.: PCT/EP2014/078039
§ 371 (c)(1),
(2) Date: Jun. 13, 2017

(87) PCT Pub. No.: WO2016/095973
PCT Pub. Date: Jun. 23, 2016

(65) Prior Publication Data
US 2017/0347371 A1 Nov. 30, 2017

(51) Int. Cl.
*H04W 74/04* (2009.01)
*H04L 12/28* (2006.01)
(Continued)

(52) U.S. Cl.
CPC ............. *H04W 74/04* (2013.01); *H04L 12/28* (2013.01); *H04L 12/43* (2013.01); *H04L 45/20* (2013.01)

(58) Field of Classification Search
CPC ..... H04L 47/10; H04L 47/2441; H04L 47/30; H04L 47/32; H04L 12/5602
(Continued)

(56) References Cited

U.S. PATENT DOCUMENTS

| | | | | |
|---|---|---|---|---|
| 4,860,285 A | * | 8/1989 | Miller | H04J 3/0688 370/507 |
| 6,549,046 B1 | * | 4/2003 | Klecka, III | H03L 7/00 327/153 |

(Continued)

FOREIGN PATENT DOCUMENTS

| | | | | |
|---|---|---|---|---|
| EP | 1 186 192 B1 | * | 5/2000 | ............... H04Q 7/38 |
| EP | 1186192 | | 3/2002 | |

OTHER PUBLICATIONS

International Search Report for Application No. PCT/EP2014/078039 dated Sep. 8, 2015 (2 pages).

*Primary Examiner* — Gbemileke J Onamuti
*Assistant Examiner* — Sanjay K Dewan
(74) *Attorney, Agent, or Firm* — Michael Best & Friedrich LLP

(57) ABSTRACT

A method of transmitting data between network devices over a non-deterministic network with a multiple channel access method, wherein it is not possible to determine, whether a network device can access the non-deterministic network, wherein the non-deterministic network comprises a plurality of network devices. The method includes the steps of: synchronising clocks of individual network devices of the plurality of network devices with each other, dividing time available for transmitting the data into timeslots, designating respective pairs of consecutive timeslots to the individual network devices of the plurality of network devices, wherein an individual network device transfers data only during the respective pairs of timeslots designated to it and evaluating, whether a network device of the plurality of network devices shall retransmit data, which it has already transmitted during a first timeslot of a pair timeslot, within the second timeslot of the pair of timeslots.

5 Claims, 2 Drawing Sheets

(51) Int. Cl.
*H04L 12/43* (2006.01)
*H04L 12/733* (2013.01)

(58) Field of Classification Search
USPC .......................................................... 370/235
See application file for complete search history.

(56) References Cited

U.S. PATENT DOCUMENTS

| | | | |
|---|---|---|---|
| 6,760,782 B1 | 7/2004 | Swales | |
| 6,775,298 B1* | 8/2004 | Aggarwal | H04L 67/06 370/219 |
| 7,447,931 B1* | 11/2008 | Rischar | H04J 3/0697 368/46 |
| 8,149,880 B1* | 4/2012 | Cho | H04J 3/0664 370/256 |
| 2002/0167961 A1* | 11/2002 | Haartsen | H04W 72/10 370/444 |
| 2008/0137474 A1* | 6/2008 | Dashevskiy | E21B 47/00 367/13 |
| 2009/0184871 A1* | 7/2009 | Tofighbakhsh | G01S 5/0027 342/357.25 |
| 2009/0310571 A1* | 12/2009 | Matischek | H04W 72/0406 370/336 |
| 2010/0073044 A1* | 3/2010 | Cornelius | H03L 7/00 327/145 |
| 2010/0115047 A1* | 5/2010 | Briscoe | G06F 1/12 709/208 |
| 2012/0300795 A1* | 11/2012 | Joergensen | H04J 3/0667 370/503 |
| 2014/0281037 A1* | 9/2014 | Spada | H04L 69/28 709/248 |
| 2016/0330012 A1* | 11/2016 | Liu | H04J 3/0664 |

\* cited by examiner

METHOD OF TRANSMITTING DATA BETWEEN NETWORK DEVICES OVER A NON-DETERMINISTIC NETWORK

BACKGROUND OF THE INVENTION

The invention relates to a method of transmitting data between network devices over a non-deterministic network.

IEEE 802.11 is a standard for wireless networks, which has been used for more than a decade and has created a capability for transmitting wideband data over a wireless interface. Whilst the first generation (IEEE 802.11b) only had limited data throughput, the recent upgrade to IEEE 802.11n has increased this number significantly. With the addition of multiple streams (Multiple Input Multiple Output, MiMo) data throughput has increased to 600 Mbps and will keep on increasing in the future.

Already the first version of IEEE 802.11 gave the opportunity to have a wireless extension to the Ethernet network and also to be able to run all protocols that run on top of the Ethernet physical layer (such as IP, TCP/IP and UDP/IP) on top of the 802.11 PHY/MAC (physical layer/Media Access Control).

For the (wired) Ethernet network there are various protocols to transmit media data, particularly with a low latency (e.g. CobraNet, Dante, Ravenna, AVB, Livewire). All of these protocols have specific requirements on latency, packet rate and bandwidth.

One of the key characteristics of the 802.11 MAC (Media Access Control) is that it uses a so called Carrier Sense Multiple Access with Collision Avoidance (CSMA/CA) channel access mechanism. A multitude of network devices can be connected to the same transmission medium to transmit over it and to share its capacity. This mechanism causes non-determinism in the actual data transfer. Thus, those kinds of networks are referred to as non-deterministic networks. Apart from wireless networks, other examples of such non-deterministic networks are bus networks, ring networks, star networks or half-duplex point-to-point links.

With this multitude of network devices sharing the non-deterministic networks, it is not possible to determine, whether a network device can access the medium. Moreover, it is difficult or can even be impossible to predict, whether a network device is able to transmit data over the non-deterministic network. If a media data (media data packet) is sent to the network interface then the actual transmission might be delayed depending on whether the non-deterministic medium is sensed as busy or not.

Traditional media/data streaming applications take care of this non-determinism by adding (large) data buffers and only start playback when the buffer is filled. This however adds a lot of latency (often in the range of is or more) to the media/data stream. Moreover, these known implementations were designed for wired networks and are usually not compatible with non-deterministic networks. Because of this non-determinism it is not realistic to send the above mentioned low latency protocols over a non-deterministic network using a CSMA like MAC (like e.g. 802.11) and achieve a good performance.

Thus, the task of the invention is to provide a method to transmit data, particularly low latency media data, over a non-deterministic network and achieve a good performance and a low latency.

SUMMARY OF THE INVENTION

According to the invention, a method of transmitting data between network devices over a non-deterministic network is suggested.

Non-deterministic networks are especially networks, with a (multiple) channel access method, i.e. networks, wherein it is not possible to determine a time needed for a network device to access the non-deterministic network. Especially it is not possible to determine, whether a network device can access the non-deterministic network. Moreover, it is not possible to determine with certainty, whether a network device can transmit data over the non-deterministic network (variable, not predictable latency). The method according to the invention comprises three phases: a synchronisation phase, a scheduling phase, and a retransmission phase.

In the synchronisation phase, the network devices in the non-deterministic network are synchronised. Particularly, a first clock of a first network device and a second clock of a second network device are synchronised. This way, all network devices within a plurality of network devices have the same notion of time and hence a common time base to operate with. This synchronisation is preferably achieved by a Precision Time Protocol (PTP).

With the clocks of every network device synchronised, the scheduling phase can be executed. The time, particularly available time in which data can be transmitted, is divided in timeslots. The timeslots are respectively designated to the network devices. The timeslots are divided into pairs of consecutive timeslots. Those pairs of timeslots are designated to the network devices. Hence, always pairs of consecutive timeslots are designated to the network devices.

The individual network devices are only allowed to transmit data during their respectively designated pairs of timeslots. Particularly, a master, e.g. a station controller of the non-deterministic network, designates the pairs of timeslots to the network devices.

Due to the synchronisation of the clocks of the network devices, this scheduling is possible. Due to the common time base of all the network devices a binding schedule for all network devices can be set, which all network devices are able to stick to. This way a Time Division Multiplex (TDM) can be defined. Thus the data transmission of the network devices can be scheduled. This way it is possible to prevent self interference in the non-deterministic network.

Preferably, the timeslots are designated to the individual network devices with a fixed timeslot-offset at the beginning of the timeslot. Hence there is a fixed timeslot-offset between the beginning of the timeslot and the beginning of the data and/or data packet. This way collision between the data and/or data packets of different network device in consecutive timeslots is avoided.

The respective pairs of timeslots are preferably designated to the individual network devices according to a latency of the data to be transmitted. This way it is achieved that data with low latency is transmitted accordingly.

Alternatively of additionally, the respective pairs of timeslots are particularly designated to the network devices according to the current (amount of) data to be transmitted by the network devices. The respective pairs of timeslots are designated to network devices, which have to transmit data. Particularly, the network devices, which have to transmit data, can make an appropriate announcement to the master. According to these announcements, the master designates the timeslots.

The pairs of timeslots can also be designated a priori. Particularly, the pairs of timeslots can be consecutively designated to the network devices, i.e. the individual network devices are allowed to transfer data in a fixed order and in constant time intervals. The respective pairs of timeslots can also be designated to the network devices according to priority of the individual network devices. That means network devices with a higher priority, which transmit data of a higher priority, are designated pairs of timeslots to more often. Hence, the network devices with higher priority are allowed to transfer data more often than network devices with lower priority. The pairs of timeslots can also be designated to the network devices according to activity of the network devices. This means that more pairs of timeslots are designated to more active network devices, which transfer more data than less active network devices.

The retransmission phase addresses the case, that a network device retransmits data. Particularly, the data is compiled in data packets. The network device transmits the data/data packets during a first timeslot of a designated pair of timeslots. Afterwards it is evaluated, whether the network device shall retransmit that said data/data packet, which it has already transmitted during the first timeslot of the pair timeslot, within the second timeslot of the pair of timeslots. If it is evaluated that the network device shall retransmit the data/data package, the network device retransmits the data/data package within said second timeslot of the pair of timeslots.

According to the invention, a network device transmits data twice, whenever possible. It is evaluated, whether it makes sense and whether it is reasonable to retransmit the data. If that is the case, the network device retransmits the data in the second timeslot of the pair of timeslots. Thus, data/data packets are generally transmitted twice by a network device. This way, it can particularly be guaranteed that data is received at the corresponding recipient. If the transmission within the first timeslot of the pair of timeslots is not received at the corresponding recipient or is received defective, it is (almost) certain, that the transmission within the second timeslot of the pair of timeslots is received.

Prior art solutions, like e.g. the IEEE 802.11 standard, especially the IEEE 802.11 MAC standard, provide acknowledgement signals (ACK) and retransmissions. Acknowledgement signals (ACK) confirm receipt of the data. Data is retransmitted, until an acknowledgement signal is received. These acknowledgement signals and retransmissions cause additional traffic and strain the non-deterministic network's data transfer. These problems are overcome by the invention.

According to the invention, the first timeslot of the pair of timeslots designated to a network device is reserved for transmitting the data once. The second timeslot of the pair of timeslots designated to a network device is reserved for transmitting the data a second time. Thus, acknowledgement signals do not have to be applied. Moreover the retransmission of data is arranged and controlled.

Particularly, it is evaluated whether it makes sense or whether it is possible to retransmit the data during the remaining time of the current pair of timeslots. If it is evaluated not to retransmit the data, the data is lost. The data can then again be transmitted in the next pair of timeslots designated to the corresponding network device. This evaluation and the retransmission phase are particularly executed by using a Forward Error Correction (FEC) and/or a Packet Loss Concealment (PLC).

The invention prevents self interference and reduces traffic in the non-deterministic network. When a network device transmits data over the non-deterministic network, this data transmission will not be interfered with or delayed. The non-deterministic network cannot be too busy or overloaded, since only designated network devices are allowed to transmit data at any given time. Moreover, the data transmission according to the invention in the non-deterministic network is deterministic. It is prevented that data transmissions are unforeseeably delayed, cancelled or disturbed. Data transmission can be executed with a good performance and a low latency. With the invention, the data can be transmitted over the non-deterministic medium using established standards like CSMA (like e.g. 802.11), but nevertheless a good performance and a low latency can be achieved.

Preferably, media data is transmitted over the non-deterministic network. Alternatively or additionally, data with low latency is preferably transmitted over the non-deterministic network. With the possibility of achieving good performance and low latency, the method according to the invention is especially convenient for media data and/or data with low latency. The non-deterministic network is particularly part of a media network. The network devices are particularly designed as multi-media devices like e.g. television devices or media players. The invention is especially convenient for streaming media data like audio and/or video data over the non-deterministic network.

Preferably, the evaluation in the retransmission phase is performed depending on the Time to Live (TTL) of the data. The Time to Live defines a time or time interval, in which it is reasonable to transfer data. When the Time to Live has elapsed, the data is discarded. It is particularly evaluated, whether the Time to Live is larger than a packet duration of the data/data packets. If this is the case, the data is retransmitted within the second timeslot of the pair of timeslots. Particularly, if the remaining Time to Live is smaller than the packet duration, it is determined that the data shall not be retransmitted.

A network device comprises at least one clock, particularly at least two clocks. Particularly, one clock of a slave is a CPU clock, i.e. a master clock of the corresponding network device. Particularly, another clock of a slave is a data clock, especially a time-sensitive data clock. This data clock is particularly used for data transfer over the non-deterministic network.

The synchronisation of the network devices in the synchronisation phase can be achieved by numerous appropriate methods. In the following, a first network device of the non-deterministic network is considered to be a master and a second network device of the non-deterministic network is considered to be slave. A clock of the slave, particularly a data clock of the slave, is adjusted in order to adapt this clock of the slave (referred to as slave clock) to a clock of the master (referred to as master clock).

For synchronising two clocks, two values or parameters are of special importance: The offset and the drift. The offset is an instantaneous difference between two clocks. The drift is an increase of this offset over time. The offset usually also takes in account a delay time (also referred to as transmit delay time or transfer delay time). This delay time is the time it takes to transmit data between the master and the slave and vice versa. Offset and drift have to be zero for clocks to be in lock. Particularly, the offset and drift of a slave clock is adjusted to zero in order to synchronise this slave clock with a master clock.

In some known implementations, the drift is used to compensate the offset and create a control-loop. A convergence time of this control-loop depends on the absolute offset, including the delay time. Usually, a certain time is required to reach the lock state, time to drift until the offset of the slave clock is zero. If the offset is large, the initial drift takes a long time. Thus it can take a long time until two clocks are synchronised.

An often used solution is a hard adjustment of the slave's system clock. However, this can have (stability) consequences for clocks, which are derived from this system clock. Furthermore, the use of the system clock potentially introduces unwanted behaviour, for example all derived clocks (also referred to as peripherals) will have a "variable" frequency instead of only the clock that requires the synchronisation.

According to a preferred method of synchronising clocks in non-deterministic networks, a deterministic approach is used instead of an adaptive approach. In course of this deterministic approach the clocks are particularly synchronised in a step based approach. The drift as well as the offset are determined directly and are compensated for specifically. This way, synchronisation of the clocks can be achieved very fast in a short time. Synchronisation is particularly achieved by exchanging appropriate data, particularly appropriate messages and/or requests. This data is especially exchanged in form of data packets, i.e. appropriate synchronisation packets.

In particular, the slave clock is decoupled from any other clock in the non-deterministic network. Thus, all the clocks of all the network devices are decoupled from each other. Particularly, each clock of a single network device is decoupled from all the other clocks of said network device, as well as decoupled from any other clock of any other network device. Hence, the slave clock of the slave, which is synchronised with the master clock, is adjusted independently and separately from any other clock of any other clock of any other network device in the non-deterministic network.

In particular, the slave clock, which is synchronised, is decoupled from the slave's system clock or local clock respectively, particularly from the slave's CPU clock. Hence, the slave's local/system clock is not adjusted in the course of this method and does not need to be adapted in order to synchronise the slave clock and the master clock. This gives more stability to the system of the slave and to other clocks, derived from the local/system clock. This decoupling of the clocks provides numerous advantages and possibilities. Thus, smooth adjustments can be made to the data clock. It is also possible to have multiple data clocks of different rates. Particularly, the slave clock, which is synchronised, is a time-sensitive data clock.

Particularly, Time of Day (TOD) is used as an absolute time of the master clock. The Time of Day contains the information year, month, day, hour, minute, second, and nanosecond. Using the Time of Day, time-sensitive data can also be transmitted between different non-deterministic networks.

In a first step of the step based approach, an analysing step, a drift of the two clocks is determined. In a second step, a drift compensation step, the drift is compensated for by adjusting the slave clock accordingly. With the drift compensated, the slave clock and the master clock are in a stable situation.

Particularly, this drift compensation is accomplished in a single update of the slave clock. By this update, the slave clock is forced into said stable situation. For this update, a relation between a control signal and a clock deviation must be known. This control signal is particularly a signal, with which the slave clock is adjusted, particularly by the clock deviation. After this update, the master clock and the slave clock are in a stable situation and hence there is no drift between these two clocks. But an (initial) offset between the two clocks will usually be present.

In a third step, an offset correction step, the offset is determined and compensated for. Particularly, also the (transfer) delay time is compensated for in this second offset correction step. Particularly, the delay time does not have to be determined specifically, but is compensated for automatically along with the offset.

In particular, the drift and the offset are determined as follows: The master transmits a first synchronisation message at a first transmission-time. The slave receives that first synchronisation message at a first receive-time. The master sends a second synchronisation message at a second transmission-time. The slave receives that second synchronisation message at a second receive-time. The drift between the master clock and the slave clock is determined taking into account the first and second receive-time as well as the first and second transmission-time. The determined drift is then compensated for.

The offset between the slave clock and the master clock is particularly determined by a delay/response request. The master transmits a third synchronisation message at a third transmission-time and the slave receives the third synchronisation message at a third receive-time. Afterwards the slave transmits a delay request at a fourth transmission-time and the master receives the delay request at a fourth receive-time. The Offset is particularly determined by the third receive-time, the third transmission-time, the fourth transmission-time and the fourth receive-time. The offset is then compensated for.

This preferred method of synchronising clocks in non-deterministic networks is particularly convenient for transmitting time-sensitive data, such as media data, via the non-deterministic network. For example time-sensitive data can be transmitted from the second network device to a third network device. The third network device is synchronised with the first network device, i.e. the master, in the same way as the second network device. This way, the clocks of the second and the third network device are synchronised as well. Hence, the slave clock which is synchronised with the master clock is particularly a time-sensitive data clock. The master clock or the master in general is particularly a time-sensitive data master clock device.

Time-sensitive data can be streaming data or streaming media, which are transmitted in the non-deterministic network of an entertainment system. Time-sensitive data can also be event-driven data, for example measurement or voting data. Such data can for example be transmitted between electronic control units (ECU) via a non-deterministic network.

BRIEF DESCRIPTION OF THE DRAWINGS

The present invention will now be described further, by way of example, with reference to the accompanying drawings, in which FIG. 1 schematically shows a non-deterministic network, which is designed to execute a preferred embodiment of a method according to the invention, FIG. 2 schematically shows a preferred embodiment of a method according to the invention as a flow chart, and FIG. 3 schematically shows a preferred embodiment of a method according to the invention as a flow chart.

DETAILED DESCRIPTION

Figure 1:
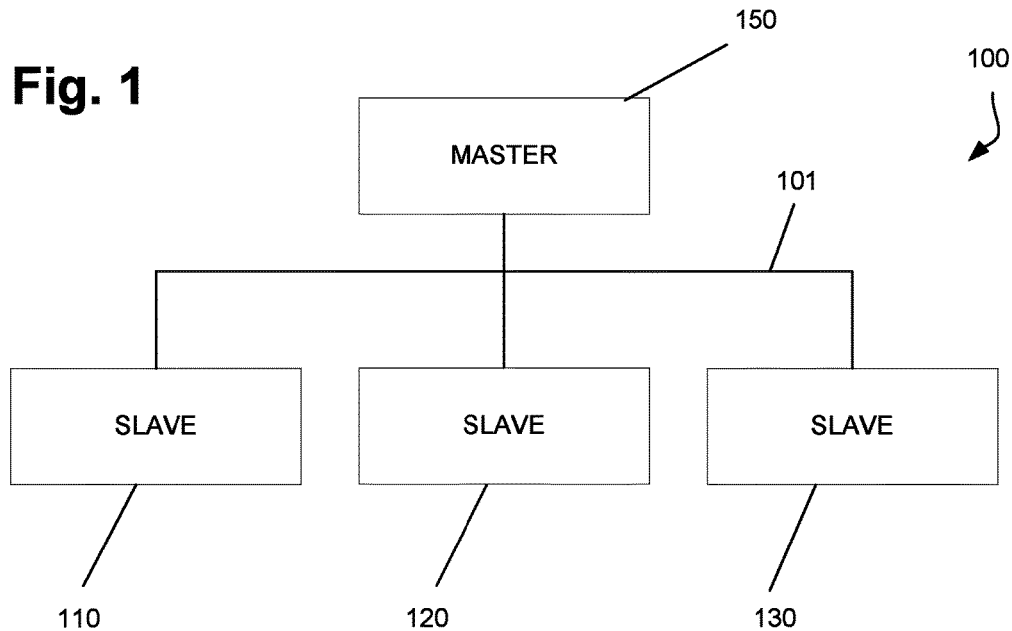

In FIG. 1 a non-deterministic network, in particular a wireless network, which is designed to execute a preferred embodiment of a method according to the invention, is schematically depicted and labelled as 100.

The wireless network 100 comprises a plurality of network devices. Three network devices 110, 120, and 130 are depicted exemplarily in FIG. 1. The network devices 110, 120, 130 are connected with each other by a wireless link, designated 101.

The network devices 110, 120, 130 are considered as slaves. A master 150 constitutes a further network device, which controls the wireless network 100. The master 150 is for example designed as a station controller of the wireless network 100. The master 150 particularly controls data transmission between the network devices 110, 120, 130 over the wireless network 100.

The wireless network 100 is particularly designed as a media network. The individual network devices 110, 120, 130 are particularly designed as media devices such as television devices, media players, and/or hi-fi equipment. The network devices 110, 120, 130 exchange data over the wireless network 100, particularly media data with low latency. In order to coordinate this data exchange, the master 150 is particularly designed to execute a preferred embodiment of a method according to the invention.

Figure 2:
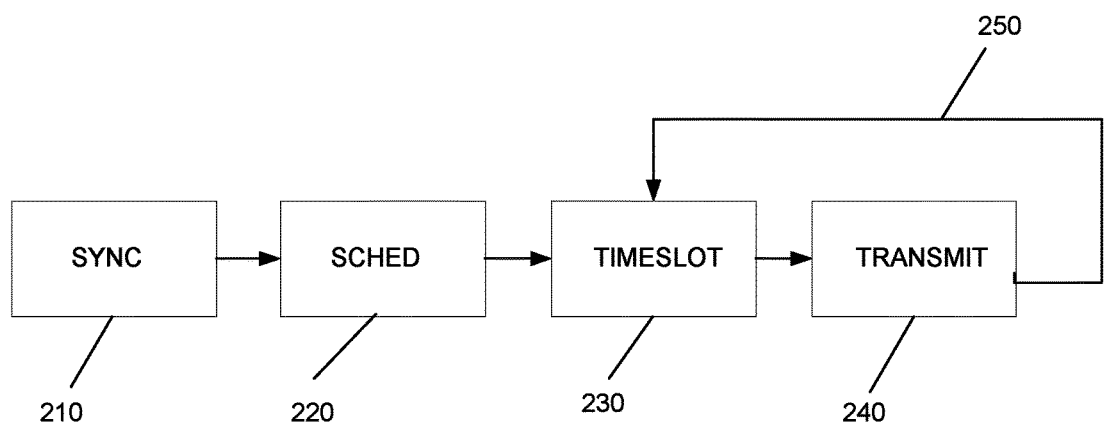

This preferred embodiment of the method according to the invention is depicted in FIG. 2 schematically as a flow chart.

In step 210 the master 150 during a synchronisation phase synchronises clocks of the individual network devices 110, 120, and 130. Time distributed by a clock of the master 150 is an absolute time. The clocks of the network devices 110, 120, and 130 are adjusted to be in lock with the clock of the master 150. Particularly, the master 150 and the network devices 110, 120, and 130 exchange appropriate synchronisation-data, such as e.g. sync messages and delay requests and delay responses.

With the clocks of the network devices 110, 120, 130 and the master 150 synchronised, the master performs a scheduling phase in step 220.

The master divides the time available for transmission of data in the wireless network 100 into timeslots. Moreover the master 150 designates respective pairs of consecutive timeslots to the individual network devices 110, 120, 130. The network devices 110, 120, 130 transmit data only during their designated respective pairs of timeslots.

In step 230 a certain pair of timeslots begins. In step 240, the corresponding network device, e.g. 110, transmits data over the wireless network 100 to a receiving entity, e.g. a media receiver device, during this pair of timeslots. Indicated by label 250, after this pair of timeslots, the consecutive pair of timeslots begins and the corresponding network device, e.g. 120, transmits data over the wireless network 100.

Figure 3:
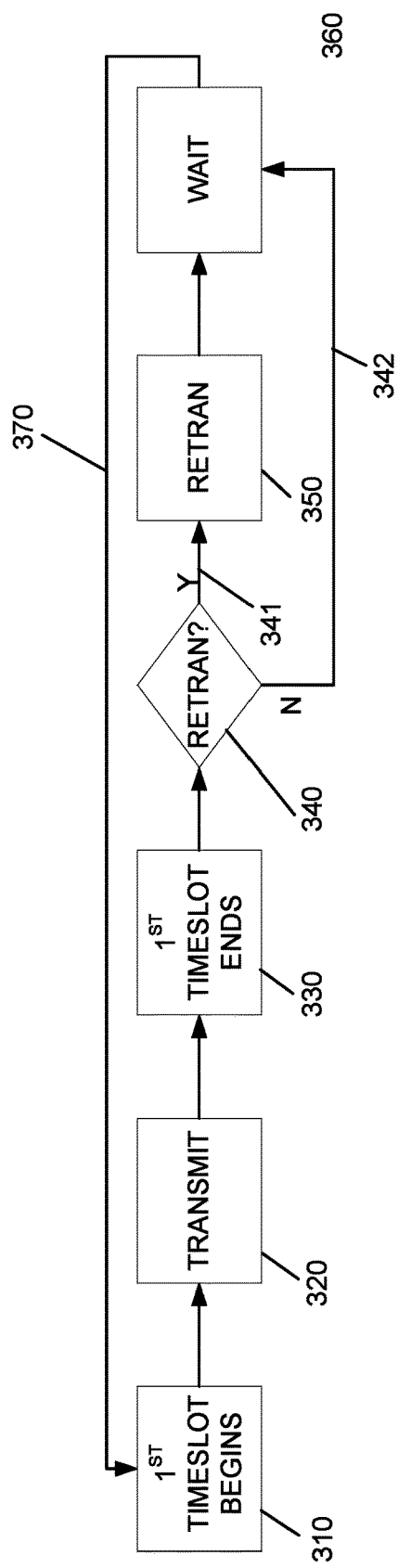

In FIG. 3 the process of transmitting data according to step 240 is depicted in detail, schematically as a flow chart.

In step 310 a first timeslot of a pair of timeslots begins. A packet trigger concerning specific data and/or a specific data packet is activated/triggered. Thus, the corresponding network device, e.g. 110, transmits this specific data/data packet in step 320. In step 330 the transmission of this specific data/data packet is completed and the first timeslot of said pair of timeslots ends.

In step 340 it is evaluated, whether the network device 110 shall retransmit the specific data/data packet in a second timeslot of the current pair of timeslots.

In step 340 it is evaluated, whether the packet duration is smaller than Time to Live (TTL) of the certain data/data packet If this is the case (label 341), the specific data/data packet is retransmitted in step 350 in the second timeslot of the pair of timeslots. If this is not the case (label 342), step 360 is performed. Step 360 is also performed after the retransmitting of the specific data/data packet in step 350.

In step 360 the network device 110 waits until another packet trigger concerning data and/or data packets is activated/triggered. Then the network device 110 begins again with step 310. Steps 310 to 360 are performed until the timeslot of network device 110 ends.

The invention claimed is:

1. A method of transmitting data between network devices over a non-deterministic network with a multiple channel access method, wherein the non-deterministic network comprises a plurality of network devices, comprising the steps of:

synchronising clocks of individual network devices of the plurality of network devices with each other, dividing time available for transmitting the data into timeslots, designating respective pairs of consecutive timeslots to the individual network devices of the plurality of network devices, wherein an individual network device transfers data only during the respective pairs of timeslots designated to it, and evaluating, whether a network device of the plurality of network devices shall retransmit data, which it has already transmitted during a first timeslot of a pair of timeslots, within the second timeslot of the pair of timeslots, wherein a first clock of a first network device of the plurality of network devices shall be synchronised with a second clock of a second network device of the plurality of network devices, wherein the first clock of the first network device and the second clock of the second network device differ by an offset and the offset changes over time due to a drift, wherein synchronising the first clock of the first network device with the second clock of the second network device comprises the steps of:

determining the drift between the first clock of the first network device and the second clock of the second network device in a first step, compensating for the determined drift between the first clock of the first network device and the second clock of the second network device in a second step, and determining and compensating for the offset between the first clock of the first network device and the second clock of the second network device in a third step.

2. The method of claim 1, wherein media data is transmitted over the non-deterministic network between network devices.

3. The method of claim 1, wherein data with low latency is transmitted over the non-deterministic wireless network between the network devices.

4. The method of claim 1, wherein the evaluation is performed depending on a Time to Live (TTL) of the data to be transmitted.

5. The method of claim 1, wherein the timeslots are designated to the network devices with a fixed offset at the beginning of the timeslot.

* * * * *